Aug. 27, 1935.　　　　C. Z. MILLER　　　　2,012,767
SLED
Filed Jan. 3, 1934
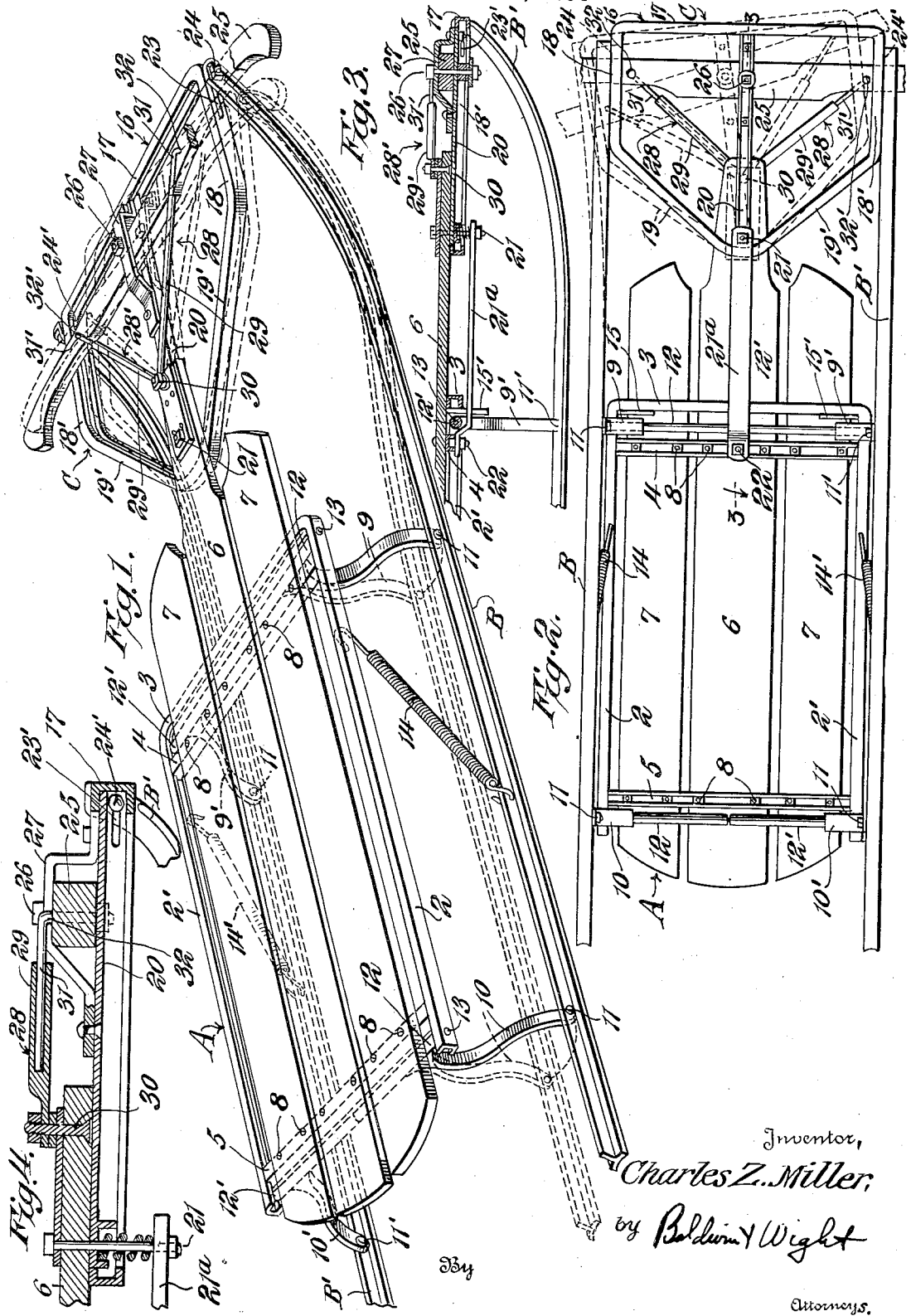
Inventor,
Charles Z. Miller,
by Baldwin y Wight
Attorneys.

UNITED STATES PATENT OFFICE 2,012,767

SLED

Charles Z. Miller, Fort Scott, Kans.

Application January 3, 1934, Serial No. 705,119

14 Claims. (Cl. 280—22)

This invention relates to sleds and more particularly to sleds having runners especially adapted for facilitating steering. Heretofore various arrangements of runners have been employed for facilitating the steering of sleds, probably the best known of which is that in which the runners are arranged to be simultaneously flexed laterally at their forward ends. While this arrangement has in general served to steer the sled satisfactorily, it has been found that when sharp turns are made there is a tendency for the sled to overturn or to skid.

In my United States Patent 1,903,930, granted April 18, 1933, there is shown, described, and claimed a sled provided with vertically collapsible runners each of which is normally urged downwardly with respect to the sled frame but is adapted to collapse or be moved relatively toward the frame upon the concentration of weight above the runner, thereby to cause the sled frame to be tilted and the sled to be steered. This sled possesses the advantage of great simplicity and is readily steerable under ordinary circumstances; but I have found that, where relatively sharp turns are to be made, it is desirable that the runners be positively collapsed with respect to the frame.

Accordingly, an object of the present invention is to provide in a sled of the general character referred to novel means for positively effecting collapsing movement of one or the other of the sled runners, thereby to cause the sled top or seat to be inclined relative to the ground to produce a banked effect. In this way the sled is steered and the danger of skidding or upsetting when making a turn is decreased.

Another object is to provide a sled of the character referred to in which the runners, in addition to being adapted to collapse, i. e., to move relatively toward the frame, are laterally flexible, and in which are included steering means for simultaneously flexing the runners laterally and effecting collapsing movement of one of them. More specific objects will become apparent from a reading of the following description, the appended claims, and the accompanying drawing, in which:

Figure 1 is a perspective view of a sled embodying the invention;

Figure 2 is a bottom plan view of the sled shown in Figure 1;

Figure 3 is a fragmentary vertical sectional view taken on the line 3—3 of Figure 2; and Figure 4 is an enlarged fragmentary vertical sectional view showing steering mechanism at the front end of the sled.

In the drawing, which illustrates one practical and the at present preferred embodiment of the invention, a sled is shown as comprising a frame A and laterally flexible runners B—B' yieldably connected to the frame for movements both laterally of and upwardly with respect to the frame in a manner to be described hereinafter.

The frame A includes side members 2—2' formed integrally with a front cross member 3 and cross members 4 and 5 secured to the side members 2—2' adjacent the front cross member 3 and to the rear of the sled respectively. Also forming part of the frame is a central slat 6 and side slats 7—7 secured to the cross members 4 and 5 as by bolts 8.

The runners B—B' are connected to the frame by means of front struts 9—9' and rear struts 10—10' respectively, these struts being pivotally connected to the runners at 11—11' and having bearing sleeves 12—12' at their upper ends journalled on cross shafts 13—13 extending between the side members 2—2' of the frame. Diagonally disposed springs 14—14' are connected between the runners B—B' and the frame members 2—2' respectively. These springs serve constantly to urge the runners forwardly relative to the sled frame, and the forward movement of the runners is limited by engagement of the foremost struts 10—10' respectively with stop plates 15—15' secured to the front cross member 3 of the frame.

In accordance with the invention, steering means C is provided for simultaneously flexing the runners laterally and depressing only one of them, i. e., moving one runner rearwardly and upwardly relative to the sled frame, the runner thus partaking of a movement having components both perpendicular to and longitudinally with respect to the frame. In the form shown, the steering means includes a steering yoke 16 comprising a front transverse portion 17, forward portions 18 and 18' which merge with converging rear portions 19 and 19' respectively, and a central longitudinally extending part 20. The yoke 16 is pivotally connected to the frame by a bolt 21 passing through the central slat 6 of the frame and through the central longitudinally extending part 20 of the yoke. In order to maintain the bolt 21 substantially perpendicular to the frame and yoke without requiring any clamping of the yoke and frame together, a brace or strap 21ª is connected to the cross bar 4 as at 22 and to the pivot bolt 21. The side portions 18—18' of the yoke are formed with slots 23—23' respectively receiving pins 24—24' on the runners 2 and 2', the pins and slots constituting lost motion connections between the steering yoke and runners. A steering bar 25 is pivotally mounted on the yoke by means of a bolt 26 which passes through the central part 20 of the yoke and through a strap 27 secured to the part 20 and extending over the steering bar. Lost motion connections 28—28' are connected between the sled frame and the steering bar at points on opposite sides of the pivot bolt 26. In the form shown, these connections comprise respectively hollow links 29—29' pivoted as at 30 to the slat 6 in front of the bolt 21, and thrust rods 31—31' telescopically mounted in the hollow links and having their forward ends pivoted as at 32—32' to the steering bar 25 on opposite sides of the bolt 26.

When it is desired to steer the sled, say, to the user's right, the steering bar will be rocked in a clockwise direction as viewed from the top. This will cause the thrust rod 31 to push against the bottom of the opening in the hollow link 29 and will swing the yoke about the bolt 21 in a clockwise direction as viewed in Figure 1 (in a counterclockwise direction as viewed in Figure 2), as indicated in dotted lines in Figures 1 and 2. Thus the front of the yoke is swung to the user's right, thereby flexing both runners laterally toward the right. During this swinging movement of the yoke the forward end of the slot 23, in addition to moving toward the user's right, also will move relatively rearwardly so as to push against the pin 24 on the runner B and thereby move the runner rearwardly with respect to the sled frame and consequently upwardly relative thereto. Thus flexing of the runners is accompanied by a simultaneously collapsing movement of the runner B relative to the sled frame and a tilting of the frame toward the right so as to produce a banked effect, minimizing the danger of skidding or turning over. When the steering bar is operated in the manner described above to guide the sled toward the right, the pin 24' will ride freely in its associated slot 23', so that the runner B' will not partake of any collapsing movement. Obviously, to steer the sled to the user's left the steering bar 25 is rocked in a counterclockwise direction as viewed in Figure 1, causing both runners to be flexed laterally, and simultaneously causing only the runner B' to be moved relatively rearwardly and upwardly toward the frame.

From the foregoing, it will be seen that I have provided a sled which may be easily steered and which also provides a banked effect occurring simultaneously with steering so as to render it possible to make relatively sharp turns with a minimum danger of skidding or turning over. Various modifications may be made in the details of construction without departing from the invention as defined in the claims.

I claim:

1. In a sled, the combination of a frame; two laterally flexible runners; means connecting both runners to the frame independently of each other for movements having components both perpendicular to the frame and longitudinal with respect to the axis of the frame; and steering means connected to the frame and runners for simultaneously flexing the runners laterally and effecting such component movements of one of said runners.

2. In a sled, the combination of a frame; two laterally flexible runners; vertical struts pivotally connecting said runners to the frame for movements independently of each other; and steering means connected to said frame and runners for simultaneously flexing said runners and effecting pivotal movements of the struts connected to one runner with respect to the frame.

3. In a sled, the combination of a frame; two laterally flexible runners; vertical struts pivotally connecting said runners to the frame for movements independently of each other; and steering means including a lost motion connection connected to said frame and runners for simultaneously flexing said runners and effecting pivotal movements of the struts connected to one runner with respect to the frame.

4. In a sled, the combination of a frame; two laterally flexible runners; vertical struts pivotally connecting said runners to the frame for movements independently of each other; means for urging said struts to vertical position; stop means for limiting movement of said struts to normally maintain the struts in vertical position; and steering means connected to said frame and runners for simultaneously flexing said runners and effecting pivotal movements of the struts connected to one runner with respect to the frame.

5. In a sled, the combination of a frame; two laterally flexible runners; means connecting both runners to the frame independently of each other for movements having components both perpendicular to the frame and longitudinal with respect to the axis of the frame; a steering yoke connected to each of said runners; a pivotal connection between said yoke and said frame; and means connected to said frame and yoke for rocking the yoke about its pivot on the frame as an axis.

6. In a sled, the combination of a frame; two laterally flexible runners; means connecting both runners to the frame independently of each other for movements having components both perpendicular to and parallel with the frame; a steering yoke; a pin and slot connection between said yoke and each of said runners; a pivotal connection between said yoke and said frame; and means connected to said frame and yoke for swinging the yoke about its pivot on the frame.

7. In a sled, the combination of a frame; two laterally flexible runners; means connecting both runners to the frame independently of each other for movements having components both perpendicular to the frame and longitudinal with respect to the axis of the frame; a steering yoke connected to each of said runners; a pivotal connection between said yoke and said frame; a steering bar pivotally connected to said yoke; and connections extending respectively from spaced points on the steering bar on opposite sides of the connection of the latter to the yoke to a point of common connection with the frame.

8. In a sled, the combination of a frame; two laterally flexible runners; means connecting both runners to the frame independently of each other for movements having components both perpendicular to and parallel with the frame; a steering yoke connected to each of said runners; a pivotal connection between said yoke and said frame; a steering bar pivotally connected to said yoke; and lost motion connections between said frame at a point spaced from the connection of the yoke to the frame and the steering bar on opposite sides of its point of connection to the yoke.

9. In a sled, the combination of a frame; two laterally flexible runners; means connecting both runners to the frame independently of each other for movements having components both perpendicular to and parallel with the frame; a steering yoke connected to each of said runners; a pivotal connection between said yoke and said frame; a steering bar pivotally connected to said yoke; and telescopic thrust links respectively extending from a common point on said frame spaced from the frame-yoke connection to said steering bar on opposite sides of its connection to the yoke.

10. In a sled, the combination of a frame; two runners; means connecting both runners to the frame independently of each other for movements having components both perpendicular to and parallel with the frame; a steering yoke connected to each of said runners; a pivotal connection between said yoke and said frame; a steering bar pivotally connected to said yoke; and telescopic thrust links respectively extending from a common point on said frame spaced from the frame yoke connection to said steering bar on opposite sides of its connection to the yoke.

11. In a sled, the combination of a frame; two runners; means connecting both runners to the frame independently of each other for movements having components both perpendicular to and parallel with the frame; and a steering device connected to said runners for positively effecting such movements of only one of the runners at one time.

12. In a sled, the combination of a frame; two runners, vertical struts pivotally connecting said runners to the frame for movements independently of each other; a steering device for effecting pivotal movements of said struts with respect to the frame; and a lost motion connection between each of said runners and said steering device.

13. In a sled, the combination of a frame; two runners; yieldable connecting means between each runner and the frame, the connecting means for each runner including a substantially vertical strut pivoted at its opposite ends to the frame and to the runner respectively, resilient means constantly urging said strut in one direction about its pivot on the frame, and a stop for limiting movement of said strut in said direction; and a steering device connected to each runner.

14. In a sled, the combination of a frame; two laterally flexible runners; means connecting said runners to the frame for bodily movement throughout their entire extents including all ground engaging surfaces relative to the frame; and steering means connected to the runners for flexing them laterally and simultaneously bodily moving one entire runner throughout its entire extent including all ground engaging surfaces vertically upwards relative to the frame.

CHARLES Z. MILLER.